June 29, 1948. E. C. LATHROP ET AL Re. 23,012
CORK SUBSTITUTE AND A PROCESS FOR ITS PRODUCTION
Original Filed Aug. 21, 1943
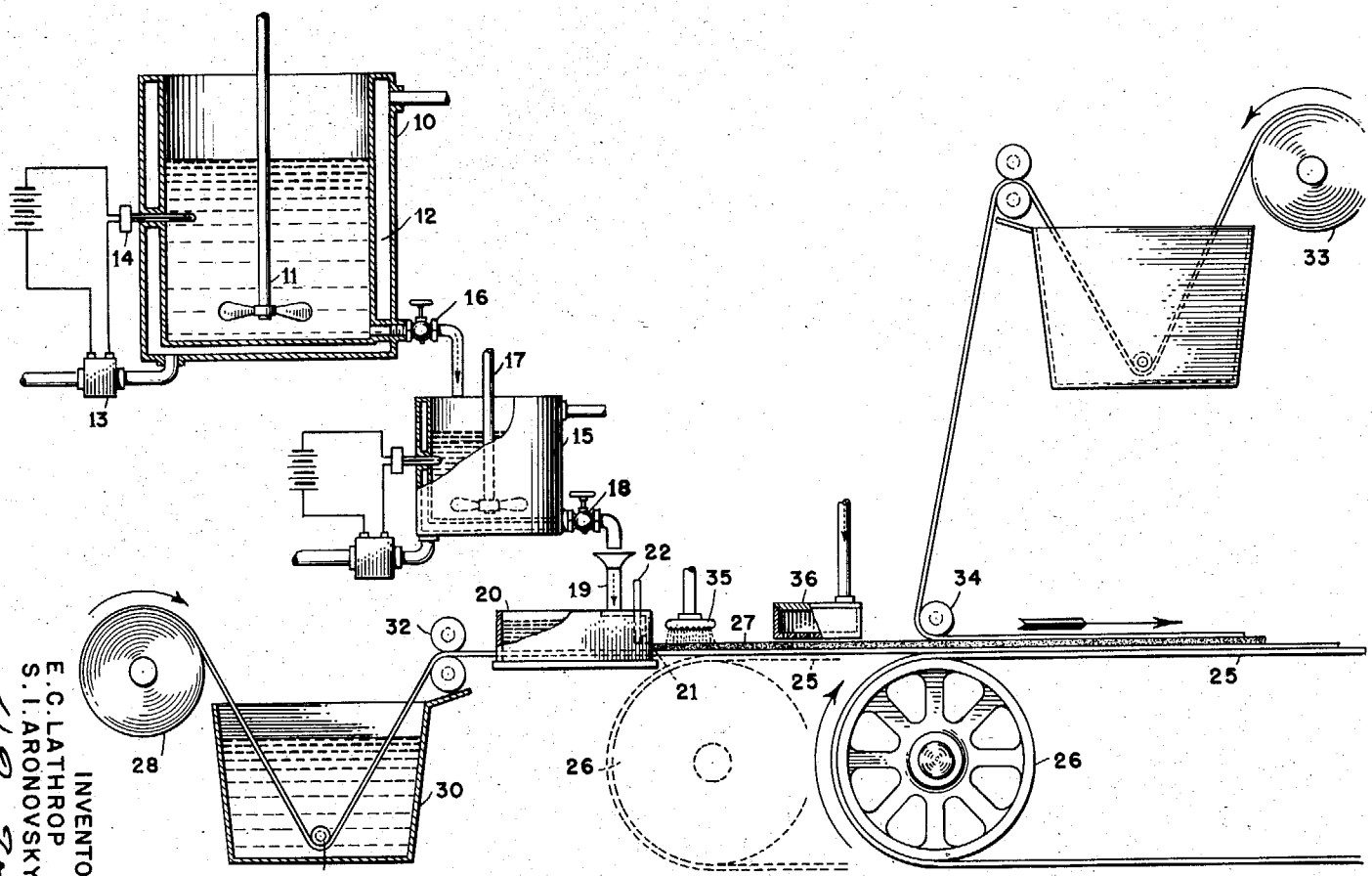
INVENTORS
E. C. LATHROP
S. I. ARONOVSKY
BY H. R. Foss
J. A. Seegrist
ATTORNEYS Reissued June 29, 1948

Re. 23,012

UNITED STATES PATENT OFFICE 23,012

CORK SUBSTITUTE AND A PROCESS FOR ITS PRODUCTION

Elbert C. Lathrop and Samuel I. Aronovsky, Peoria, Ill., assignors to the United States of America as represented by the Secretary of Agriculture Original No. 2,433,849, dated January 6, 1948, Serial No. 499,508, August 21, 1943. Application for reissue April 27, 1948, Serial No. 23,608

3 Claims. (Cl. 106—122)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to cork substitutes and more particularly to plastic compositions containing pithy cellulosic materials, and has among its objects the production of synthetic materials having properties similar to those of natural cork; the process and apparatus providing for forming sheets of the plastic compositions, which may be strengthened by added sheets of reinforcing material bonded to either or both sides, or which may be formed with any desired surface configuration or design; and such other objects as will be apparent from the following description, appended claims, and annexed drawing.

The compressible and elastic properties of natural cork are inherent to a great extent in the structure of this material. Natural cork consists of an essentially uniform aggregation of minute cells, the living contents of which have disappeared while the walls of the cells have become thickened and toughened as a result of the formation in them of various substances of complex nature. Each of these minute, relatively thick walled cells contains air and is sealed against all other cells so that the entrapped air cannot move about within the material.

We have discovered that compositions possessing compressible and elastic properties similar to those of natural cork can be obtained by enclosing numerous minute cell-containing particles of comminuted, pithy, natural cellulosic material in an elastic material, thus forming a plastic composition containing numerous microscopic gas cells uniformly distributed therein and bound together by relatively thick elastic partitions.

In general, the cork substitutes of this invention are obtained by first uniformly distributing the particles containing gas or air cells throughout a suitable fluid medium and thereafter converting the fluid medium to a resilient elastic solid.

The nature and composition of the fluid media may vary, depending upon the operating conditions and the properties desired in the final products. In general, the fluid medium comprises an elastomer, that is, a substance possessing some degree of residual resilience, dispersed in a suitable solvent or dspersing agent.

We prefer to use elastomers of a proteinous nature, such as gelatin, glue, casein, soybean proteins or soybean meal, egg albumin and the like, and to disperse them in an aqueous dispersing media, including such liquids as water, aqueous ammonia, borax solution, sodium hydroxide solution, sodium carbonate solution, and certain organic nitrogen compounds, such as urea, various amines, and so forth, the selection of the dispersing agent being determined by the nature of the elastomer, as is well known to persons familiar with the chemistry of these materials. However, other organic elastomers, including "Vinylite" type resins, such as polyvinylchloride or acetate, may be used by converting them to a fluid state by means of suitable organic solvents. Solvents for this purpose are well known.

The properties of the final products may be controlled by additions of such substances as plasticizers and water-proofing agents which, in combination with the elastomers, modify their physical characteristics. For example, paraffin or other waxy materials, such as wax size, rosin size, high or low melting petroleum jellies, and so forth, may be used as water-proofing agents, and proteinous water-dispersible elastomers may be combined with permanent plasticizing agents, for example, glycerol (glycerine); glycols, such as diethylene glycol, ethylene glycol, butylene glycol, propylene glycol; sorbitol; mannitol; glucose syrups, such as corn syrup; malt extract; invert sugar; and similar lyophilic agents.

As a source of finely divided particles containing gas or air cells to be distributed throughout the fluid medium, we prefer to use comminuted cellulosic materials of a pithy or fibrous nature containing numerous air-filled interstices, such as paper pulp, wood pulp, and agricultural residue pulps including such materials as ground corncobs, ground peanut shells, cornstalk pith, bagasse pith, sorghum pith, or similar foraminous cellulosic substances.

The particles are added to the fluid medium and uniformly distributed therein by agitation, for example. A heterogeneous mixture is thus formed wherein the entrapped particles constitute the enclosed phase suspended in the fluid medium which constitutes the continuous phase of the mixture.

The number of air cells present in the mixture may be further increased by physical and by chemical means. Thus, foaming agents such as soaps, saponin, sodium hexametaphosphate, sulfonated fatty acids or alcohols, and so forth, may be added and the mixture subjected to vigorous agitation to entrap gas cells. Similar results can be obtained by addition of blowing agents which induce froth formation either by thermal decomposition like ammonium bicarbonate or by chemical reaction like bicarbonates used in combination with weak acids, such as, for example, stearic acid.

The cork substitutes are obtained by converting the fluid medium of the mixture to an elastic solid by addition of suitable setting agents, including aldehydes such as Formalin, paraformaldehyde, formaldehyde, and formaldehyde and ammonia, hexamethylene tetramine, tannins, or chromium compounds, such as potassium dichromate, and then drying the solidified material.

The invention is practiced preferably according to the following general procedure.

A mixture comprising the elastomer, the dispersing agent, with or without a plasticizer and water-proofing agent, and the foraminous cellulosic material, is agitated, preferably with application of heat, until the elastomer is dispersed and an intimate mixture of the components has been effected. The homogeneous mixture thus obtained is subjected to high speed agitation and the foaming or froth-producing agent is added, if one is used. The mixture is then brought to the desired degree of intumescence by maintaining it under vigorous agitation for the necessary length of time. After adding the setting agent, the mixture may be extruded into desired forms, may be poured into a suitable container or mold and allowed to solidify, or it may be formed into sheets by the process and apparatus later set forth. It is then dried under controlled humidity conditions.

As illustrative embodiments of a manner in which our invention may be carried out in practice, the following example is given:

*Example 1*

| | Parts |
|---|---|
| 1. Gelatin (elastomer) | 40 |
| 2. Water (dispersing agent) | 200 |
| 3. Paraffin (water-proofing agent) | 2 |
| 4. Glycerine (plasticizer) | 30 |
| 5. Glucose syrup (plasticizer) | 30 |
| 6. Ground peanut shell (particles containing gas or air cells) | 40 |
| 7. Saponin (foaming agent) | 0.4 |
| 8. Formalin (setting agent) | 3 |

The gelatin is mixed with water and heated until the gelatin is melted, forming a gelatin and water solution. The temperature may be maintained at any desirable point above the melting point of the gelatin solution, but we prefer a temperature of 60° to 65° C., in which range decomposition of the gelatin does not take place readily. The other materials, with the exception of the Formalin, are then added to the hot gelatin solution, or all the other components with the exception of the Formalin may be mixed together in the cold and heated until a uniform mixture is obtained, which is then added to the hot gelatin solution, or a portion of the water, glycerine, and glucose syrup may be mixed with the gelatin and the remainder mixed with the peanut shell, and the two mixtures heated separately and then mixed together, or the cold peanut shell mixture may be poured into the hot gelatin mixture and stirred until smooth. The paraffin may be added at any time during the mixing and heating, and stirred into the mixture until it is melted and uniformly distributed into the latter, or it may be added in the molten condition to the mixture. The saponin may be added at any time during the above procedure or during the whipping stage to be described later.

After the mixture is all melted and uniform in appearance, it is placed in high speed mixing equipment. If the saponin had not been added previously, it is added at this point. Then the mixture is stirred at any desired speed above that necessary to keep the paraffin from coalescing into large particles as the temperature of the mixture decreases. As the temperature falls, preliminary gelation of the mixture commences to entrap air. The amount of air beaten into the mixture can be controlled by the speed of stirring and by the temperature of the mixture, greater speeds and lower temperatures resulting in a larger amount of occluded air.

When the mixture has reached the desired consistency, that is, when it contains sufficient air, the Formalin is added and, after the latter is uniformly distributed throughout the mixture, the mass is poured into a mold, or plated out on a flat surface, or extruded, as desired. Chilling the mixture immediately after pouring may be desirable, as in extrusion, to set the mixture thermally and thus prevent the material from flowing prior to the setting-up or hardening action of the Formalin, but this is not necessary as the same result may be obtained by regulation of the consistency of the mixture prior to pouring.

The poured mixture sets-up or hardens sufficiently in a few minutes to enable it to be removed from the mold, surface, or extrusion apparatus. At this stage it is soft, very flexible, and has a rubber-like elasticity. After drying in a humid atmosphere at any desired temperature up to about 105° C., the material hardens somewhat, the degree of hardening increasing with the time and temperature of drying. On removal from the drying chamber and exposure to the normal conditions of room temperature and humidity, the hardened material becomes soft and resilient, but not to the same extent as before drying, and tough. We prefer drying at 50° to 65° C. to prevent excessive loss of moisture and reduce the time of return to normal conditions, or of seasoning. The material is now ready to be cut, sliced, stamped, or punched into the desired shapes.

The finished material has a cellular structure with a large number of totally enclosed air spaces. These air spaces are fairly small and uniform and are separated from each other by relatively thick partitions of the elastic solid material. Thus, the physical structure of the finished material is similar to that of cork.

The product is very resilient. It may be compressed readily to less than 40 percent of its original size without disrupting the structure. On releasing the pressure, it returns very rapidly to its original dimensions. Its resistance to oil is excellent. It can be readily dyed with any dye or pigment not incompatible with the constituents of the material. It can be lacquered, varnished, painted, or coated on the surfaces.

Practical bottling tests on beverages bottled in regular operation in commercial plants with this product as the liner in crown seals have shown that this material is fully as satisfactory as the commercial cork. Bottled beverages sealed with this material and containing up to 5 volumes of carbon dioxide ($CO_2$) gas, some pasteurized at 140° F. and some unpasteurized, showed no significant leakage of gas after being trucked for a week, after heating for one week at 120° F., or for 20 hours at 140° F., or after standing for three months under normal room conditions. Pressures of 150 pounds per square inch have been held by bottles sealed with this product.

The composition of this invention is not limited to the ingredients and proportions given in the above formula. Equally good results have been obtained with many other ingredients selected from the classes indicated above and substituted for the corresponding ingredients of the formula.

The properties of the final products may be varied within a wide range by varying the proportion of the ingredients used in the composition. For example, increasing the amount of glycerine will result in a softer, more resilient product, while increasing the glucose or ground peanut shell will give a denser and harder material. A ratio of gelatin to ground peanut shell of about one is, however, preferred. An increase in the saponin will yield a softer material, while a decrease in the amount of water will cause a denser product. The hardness of the final material will also increase, within limits, with the larger amounts of tanning or setting agents used.

The following examples illustrate a few of the possible variations of Example 1.

*Example 2*

The same ingredients are used as in Example 1, except that 40 parts of commercial acid casein is substituted for the gelatin. The casein is dispersed with any of the usual dispersion agents, such as solutions of ammonia, borax, sodium hydroxide, sodium carbonate, or organic nitrogen compounds, such as urea, various amines, and so forth. We prefer to use ammonia (approximately 10 percent of the weight of casein), but any of the above agents, either singly or in suitable combination, may be used. We prefer to disperse the casein at 60° C., which is desirable from the standpoint of time economy and low degree of casein decomposition, but any temperature from about 20° to 70° C. may be used.

When the casein is dispersed, the other ingredients may be added to the dispersion, either singly or altogether, and the same procedure is then followed as in Example 1.

The casein product is very similar in its physical characteristics to that produced with gelatin or glue, and may be used for the same purposes as the gelatin or glue products.

*Example 3*

The same ingredients are used as in Example 1, except that commercial acid casein is substituted for a portion of the gelatin or glue. The casein may be dispersed and the mixing, whipping, pouring, doctoring, and drying may be carried out substantially as described in Example 2. The resulting product has properties similar to those obtained with glue, gelatin, and casein products of Examples 1 and 2.

*Example 4*

The same ingredients are used as in Example 1, except that commercial soybean protein is substituted for the gelatin or glue. The soybean protein is dispersed with the same dispersing agents used for casein, and the mixing, whipping, pouring, doctoring, and drying may be carried out substantially as described in Example 2. The product is very similar in appearance and properties to the casein product described in Example 2.

*Example 5*

The same ingredients and substantially the same procedure are used as in Example 2, except that soybean protein is substituted for part of the casein. The properties of the product are substantially the same as those of the products of Example 2.

*Example 6*

The same ingredients and substantially the same procedure as used as in Example 1, except that soybean protein is substituted for part of the glue or gelatin. The properties of the product are essentially the same as those of the products of Example 3.

*Example 7*

The same ingredients are used as in Example 1, except 35 percent of all of the ingredients (except water) is replaced by reground material reclaimed from trimmings of previous samples of the same composition. The procedure is the same as used for the fresh ingredients and the product is very similar to that made under Example 1.

*Example 8*

A "Vinylite" type resin is emulsified with organic solvents, plasticizers, and water to form an aqueous emulsion, and 20 to 50 percent of pith-like materials, such as ground peanut shells, ground bagasse pith, and so forth, is added to the emulsion. After thorough stirring, the mixture is doctored out on a flat surface, air dried, and then dried in an oven to remove the volatile organic solvents. A pliable, tough, resilient product is thus obtained.

*Example 9*

A "Vinylite" type resin is dissolved in organic solvents, suitable plasticizers are added, and the whole mixed with sufficient pithy material to form a stiff dough. This dough is then milled in a rubber mill at controlled temperatures until a smooth sheet is obtained. This sheet, when dry, is flexible, tough, and resilient.

It has been found that when the composition of this invention is plated out upon a sheet of ordinary paper, such as kraft wrapping paper, and is allowed to dry, the paper becomes integral with the composition and cannot be peeled off from the latter, thus increasing considerably the strength of plies of the material. Wetting the paper prior to contact with the composition will result in better bonding of the two and in a lower tendency of the material to curl upon drying. This is due to the fact that the paper swells when wet and then shrinks along with the cork substitute composition during drying. The paper backing has but little effect upon the pliancy, compressibility, toughness, or resiliency of the composition. In fact, those compositions which tend to be too short to be used as such are made satisfactorily usable by addition of the paper backing.

When another sheet of paper, dry or wet, is placed on top of the composition, the resulting product has still greater strength properties and with no apparent diminution of the toughness, pliancy, compressibility, or resiliency of the uncoated material. If the composition is dry at the time the top sheet is added, the latter may be adhered to the former with any suitable adhesive, such as gelatin, glues of various types, albumin, and so forth. If the composition is wet, the top sheet, dry or wetted, may be placed upon the composition to which it will adhere very strongly without the use of an adhesive.

It has also been found that paraffin wax, polishing wax, "Vinylite" resin, ethyl cellulose, "Cellophane," and similar materials are non-bonding, that is, do not adhere strongly to this composition. Therefore, cork substitute composition may be plated out upon paper or other surfaces coated with these materials and, after drying, the coating material may be peeled off from the composition without any difficulty. The surface of the composition produced in this manner reproduces faithfully, but in reverse, the surface of the coating material with which it had been in contact. A glazed smooth-surfaced coating produces a smooth, glossy surface on the composition. Raised and depressed portions on the surface of the coated material result in a corresponding configuration in reverse on the surface of the composition. Thus, any desired surface design may be given to the composition.

Any other type of reinforcing sheet having a certain degree of capillarity to water may be used in place of paper with equally good results. Cotton, wool, silk, or similar materials will adhere strongly to, and form an integral part with, the composition.

The simplest method of obtaining continuous production is to use a moving conveyor. An apparatus designed for this purpose is illustrated in the diagrammatic figure shown in the accompanying drawing.

The ingredients of the composition, with the exception of the tanning or setting agent, are mixed and heated separately or altogether in a vessel 10 which is provided with a stirring device 11 of any conventional design and with a heating unit, such as a steam jacket 12, having a solenoid valve 13 controlled by a thermostat 14. Any other well-known type of heater may be used. After thorough mixing at the correct temperature, the fluid mixture is drained into the smaller vessel 15 through the valve 16. This smaller vessel may be provided with heat and controls similar to those of vessel 10. A high-speed stirrer 17, or similar device, for whipping or introducing air into the mixture is provided in vessel 15. One or more vessels 15 may be used, depending upon the amount of production desired, to allow one vessel to be taken out of service for cleaning without stopping production.

After stirring the mixture until it contains a sufficient amount of air and the correct temperature has been reached, the tanning or setting agent is added, and stirring is continued long enough to obtain a uniform mixture.

The mixture is then drained through the valve 18 and funnel 19 into the bay 20 provided with an exit 21, the width of which is controlled by a doctor blade 22 to control the thickness of the composition sheet.

If the composition sheet is to be formed without a reinforcing sheet, the partially set mixture is flowed directly onto an endless web 25 belted over a pulley 26 which, in this instance, is positioned as shown on the dotted lines in the drawing, and which may be covered with a non-bonding sheet with the coating facing outward to insure ease of removal of the composition sheet and to imprint any design on it corresponding to a given design on the non-bonding sheet.

If the composition sheet 27 is to be formed with a reinforcing sheet as an integral part thereof, such reinforcing sheet may be taken from a roll 28, or in any other manner, to give a continuous ribbon, and led through the bay 20 and onto the endless web 25, receiving the mixture substantially in the manner illustrated. In this instance, the pulley 26 need not be positioned under the exit 21, but may be positioned remote therefrom, as shown in the full lines in the drawing. If it is desired to pretreat the reinforcing sheet with water, chemical solutions or solvents, these are placed in a container 30 and the reinforcing sheet is passed under a roller 31 in the container and through a pair of squeeze rolls 32 to remove the excess liquid.

In some instances it is desirable to place a second reinforcing sheet on the opposite side of the composition sheet, in which case the second sheet may be taken from a second roll 33, through a tank and squeeze roll arrangement similar to that described in reference to the first-mentioned reinforcing sheet, and under a roller 34 positioned to lay the second reinforcing sheet on the top side of the composition sheet, preferably at a point directly above pulley 26.

It may be desirable in some cases to apply a spray of the setting agent onto the composition sheet after it leaves the bay 20. In this case the agent is applied by means of a sprayer 35 positioned near the exit 21. Chilling, if desired to thermally set the composition, is effected by a cooler, such as a box 36 with a perforated bottom, in which solid $CO_2$ may be placed and the stream of cold gas directed onto the composition sheet in the manner illustrated.

After a period sufficient to set the composition, which may vary from a few seconds to minutes, depending on the temperature, amount of air, amount of setting, and so forth, the composition sheet, with or without paper backing or covering, may be dried in any desired form of drier (not shown) such as a tunnel drier, festoon drier, electric heater equipped with fans to blow the hot air onto the sheets, or any other commonly known drying means. The dried material may be stored or shipped in rolls or sheets as desired.

The following illustrations are given to exhibit the methods of preparing the web-backed and special-surfaced compositions.

*Illustration 1*

A composition was made up according to the formula of Example 1. The mixing was effected in vessel 10, and the high-speed stirring and incorporation of the setting agent were carried out in vessel 15. Shortly after the setting agent had been added, the mixture was poured into the bay 20. Meanwhile, one end of a paper-reinforcing sheet from roll 28, led under roller 31, between rolls 32 and through bay 20, had been stapled to the endless web 25. The machine was started and the composition, while flowing onto the reinforcing sheet, was leveled off to the desired thickness by the doctor blade 22, and was carried along on the web 25 at the rate of about 7 feet per minute.

At the end of about 1 minute, the composition had set sufficiently so that it did not sag upon the reinforcing sheet when the latter was held in a vertical position. A thin spray of 20 percent formaldehyde solution was applied at 35, and the surface of the composition, for a distance of about 2 feet beyond 35, was chilled by a current of cold $CO_2$ gas from the box 36. The composition as set up on the reinforcing sheet was allowed to travel on the endless web between two electric heaters equipped with fans until it was dry. It was then seasoned for a few hours at a relative humidity of about 50 percent, and formed into a tight roll.

The paper-backed composition sheet was pliant, tough, and resilient. A compression pressure of 5000 pounds per square inch was insufficient to break this material, and its resiliency is attested by an elastic recovery of more than 95 percent.

*Illustration 2*

A method similar to that of Illustration 1 was followed, except that the paper reinforcing sheet was wetted in a 3 percent formaldehyde solution placed in container 30, the excess solution being removed by the squeeze rolls 32.

The product was similar in all respects to that produced in Illustration 1, but the final sheet showed considerably less tendency to curl.

*Illustration 3*

A method similar to that of Illustration 2 was followed, except that a mixture corresponding to that of Example 2 was used.

The operation of the process and the properties of the product were similar to those obtained in Illustration 1.

*Illustration 4*

A method similar to that of Illustration 1 was followed, except that a "Vinylite" coated paper was used instead of the reinforcing sheet with the "Vinylite" coating next to the composition. After drying, the "Vinylite" paper was peeled from the composition very easily, leaving the latter with a smooth, glossy surface similar to that of the "Vinylite" coating.

*Illustration 5*

A method similar to that of Illustration 4 was followed, except that the uncoated surface of the "Vinylite" paper was bonded to the composition.

After drying, discs cut from this composition were placed in bottle crowns and tested. All of the tests indicated that this material was at least as good as the composition "spotted" in a separate operation, or as good as cork composition seals.

*Illustration 6*

A method similar to that of Illustration 1 was followed, except that a second roll of reinforcing paper was used to lay on and cover the composition as it traveled along the endless web 25.

After drying, this laminated product was very resistant to tearing and had about the same toughness, pliancy, compressibility, and elastic recovery as the material prepared in Illustration 1.

*Illustration 7*

The web 25 was completely covered with "Vinylite" paper secured thereon with the coating facing outward. The bay 20 with doctor blade 22 was placed directly over the pulley 26 and the doctor blade was adjusted for the correct height. A composition corresponding to that of Example 1 was then plated out directly on the "Vinylite" paper-covered web.

After setting-up, the composition was easily peeled from the paper without removing the latter from the web.

*Illustration 8*

A method similar to that of Illustration 7 was followed, except that the composition sheet was dried before it was peeled from the paper. The peeling was accomplished with no difficulty and the surface of the composition next to the "Vinylite" coating was very smooth and glossy.

*Illustration 9*

A method similar to that of Illustration 1 was followed, except that the paper was made up by fastening together various types of paper, thus presenting various surfaces to the composition. These papers included plain kraft paper, waxed paper, varnished paper, ethyl cellulose coated paper. "Vinylite" coated paper, vegetable parchment paper, and "Cellophane." After drying, the composition was peeled easily from the waxed, ethyl cellulose, varnished, and "Vinylite" papers, and from the "Cellophane," but it could not be separated from the plain or from the parchmentized papers. The peeled portions of the composition sheet had surfaces which were exact replicas, in reverse, of the corresponding papers.

This innovation in the process and technique of forming our composition into sheets greatly increases the practical uses to which it may be put. Seals for crown closures are generally covered with "Vinylite" or other "spot" material, which is impervious to the vapors and liquids ordinarily used for food and beverage purposes, in order to prevent contamination of the food or beverage with the seal material. Placing our composition on the uncoated surface of a paper coated with "Vinylite" or other "spot" material, as in Illustration 5, results in a composition sheet with a "spot" surface, thus at the same time strengthening the composition and eliminating the extra operation of "spotting." The composition laminated between two layers of paper forms a gasket material which, when clamped between two surfaces, forms a seal that easily withstands pressures greater than 100 pounds per square inch. Seals for bottle crowns prepared from paper-backed composition were at least fully as good as the uncoated composition, in all of the practical tests applied. The paper-backed composition with the uncoated side adhered to a hard surface will form a smooth, tough, resilient insulation for that surface. Many other uses of these coated compositions for cork and rubber substitutes are apparent from a study of the properties of these compositions.

It must not be construed that our invention is limited in scope by the preceding illustrations. The latter are given merely to exhibit its possibilities. All of the compositions described above can be used equally well, depending upon the properties desired in the final product.

Any type of reinforcing sheet with the desired characteristics may be used. In the case of manufacturing uncoated compositions, the endless web itself may be made of material which does not adhere strongly to the composition, thus eliminating the necessity of using an additional non-bonding sheet.

Having thus described the invention, what is claimed is:

1. A process of forming a cork substitute comprising dispersing gelatin in water at a temperature of about from 60° to 65° C. to produce a fluid medium, mixing paraffin, glycerine, glycose syrup, minute cell-containing particles of comminuted, pithy, natural cellulosic material, and saponin therewith, agitating the mixture to produce uniformity and entrap gas cells, adding formalin, forming the mixture thus produced when it is partially set into a body of the desired shape in which the particles of natural cellulosic material and the entrapped gas cells are separated by relatively thick elastic partitions of the material composing the body, and drying the body.

2. A process of forming a reinforced composition sheet, comprising bonding a sheet of the composition, produced by the process of claim 1 excepting the forming and drying steps, onto a reinforcing sheet, and thereafter drying the composition sheet.

3. A cork substitute comprising a compressible and elastic composition having a physical structure similar to cork, made by the process of claim 1.

ELBERT C. LATHROP.
SAMUEL I. ARONOVSKY.